United States Patent Office 3,160,659
Patented Dec. 8, 1964

3,160,659
PREPARATION OF PERFLUORO- AND PERCHLO-
ROFLUORO-ACETYL CHLORIDE
Albert L. Dittman, Hackensack, and Ronald I. Zager,
Moonachie, N.J., assignors to Halocarbon Products
Corporation, Hackensack, N.J., a corporation of New
York
No Drawing. Filed May 20, 1960, Ser. No. 30,416
3 Claims. (Cl. 260—544)

This invention relates to the syntheses of perfluoro and perchlorofluoro-acetyl chloride, and has for its object the provision of an improved process for the syntheses of these compounds.

This invention is based on the discovery of the catalytic hydrolysis of chlorofluoro ethanes to produce the corresponding acetyl chlorides. We have found that the appropriate chlorofluoro ethane can be hydrolyzed efficiently by heating the compound with fuming sulfuric acid in the presence of a sulfate of mercury, preferably with a mixture of mercurous and mercuric sulfate.

The compounds produced by the process of the invention may be represented by the formula

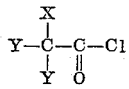

and are produced from compounds represented by the formula

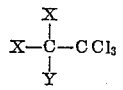

in which X represents Cl or F or any functional group which is stable under the operating conditions, such as perhaloalkyl groups, and Y represents F.

In carrying out the process of the invention, the chlorofluoro ethane is mixed with a small amount of the mercury sulfate and heated to reflux temperature. The fuming sulfuric acid is preferably added slowly at the reflux temperature. The addition of sulfuric acid usually requires several hours. During the course of the reaction, the acetyl chloride is recovered by distillation. The reactions may be run with concentrations of oleum varying from $H_2SO_4$ with a trace of $SO_3$ to pure $SO_3$. Operating temperatures may be varied by adjusting the pressure of the system and are not critical, and are selected as a matter of convenience. The concentration and composition of the mercury sulfates is not critical, the important feature is that it be used in a catalytic amount which for effective purposes is about 1% by weight of the oleum.

The following examples illustrate processes carried out in accordance with our invention for the syntheses of perfluoro and perchlorofluoro acetyl chloride.

Example 1

712 g. of the compound $CF_2Cl-CCl_3$ was combined with 3 g. of $HgSO_4$ and 3 g. of $Hg_2SO_4$ and heated to reflux. The entire reaction was run at reflux temperature. 753 g. of 65% oleum was added slowly over a six-hour period. One hour after the addition of the oleum was begun, the distillation of

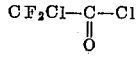

was started and the material was distilled for a total of 7 hours. The yield of the compound

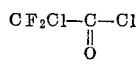

was 495 g. which is 94% of theory.

Example 2

623 g. of the compound $CF_3CCl_3$ was combined with 3 g. of $HgSO_4$ and 3 g. of $Hg_2SO_4$ and heated to reflux. All subsequent steps were carried out while maintaining the material in the pot at reflux temperature. 753 g. of 65% oleum was added slowly over 5 hours. The composed

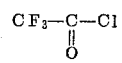

began to distill after 6 hours. Distillation was continued for a total of 100 hours yielding 399 g. of the compound

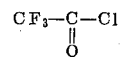

which is 91% of theory.

The compounds produced in Examples 1 and 2 were identified as follows:

The compound $CF_2ClCOCl$ had a boiling point of $+23°$ C. and when reacted with water gave the compound $CF_2ClCOOH$.

The compound $CF_3COCl$ had a boiling point of $-19°$ C. and when reacted with water gave $CF_3COOH$ having a boiling point of $+72°$ C.

The structures of the compounds were also identified by infra-red analysis.

We claim:

1. A process for synthesizing perfluoro and perchlorofluoro-acetyl chlorides which comprises mixing a catalytic amount of a sulfate of mercury with a compound of the formula:

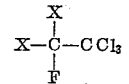

in which X is selected from the group consisting of Cl and F and heating to reflux, then adding a member selected from the group consisting of fuming sulfuric acid and $SO_3$ to the mixture slowly over a period of several hours, while maintaining the temperature at reflux, and recovering acetyl chloride by distillation as formed.

2. Process according to claim 1 in which said mercury sulfate is mercuric sulfate and mercurous sulfate present in amounts of about .5% by weight each.

3. Process according to claim 1 in which said member of said second mentioned group is fuming sulfuric acid.

References Cited in the file of this patent

UNITED STATES PATENTS 2,396,076    Benning et al. _____ Mar. 5, 1946

FOREIGN PATENTS 1,020,970    Germany _____ Dec. 19, 1957
581,628      Great Britain _____ Oct. 18, 1946